United States Patent [19]

Kanaoka et al.

[11] Patent Number: 4,519,701
[45] Date of Patent: May 28, 1985

[54] SIDE PRINTING APPARATUS

[75] Inventors: Takeshi Kanaoka; Shigehisa Shimizu, both of Kanagawa, Japan

[73] Assignee: Fuji Photo Film Co., Ltd., Kanagawa, Japan

[21] Appl. No.: 558,517

[22] Filed: Dec. 6, 1983

[30] Foreign Application Priority Data

Dec. 10, 1982 [JP] Japan ................. 57-215432

[51] Int. Cl.³ .................. G03B 27/32; G03B 27/52
[52] U.S. Cl. ................. 355/39; 346/107 A; 352/92; 354/109; 355/40; 355/64
[58] Field of Search ............. 352/92; 346/107 A; 354/106, 107, 109, 105; 355/31, 28, 29, 40, 1, 77, 64

[56] References Cited

U.S. PATENT DOCUMENTS

| | | | |
|---|---|---|---|
| 3,449,046 | 6/1969 | White | 355/1 |
| 3,603,974 | 9/1971 | Copeland, Jr. | 346/107 A |
| 3,677,146 | 7/1972 | Nielsen | 354/107 |
| 3,838,435 | 9/1974 | Mepham et al. | 354/109 |
| 3,877,799 | 4/1975 | O'Donnell | 352/92 |
| 4,123,767 | 10/1978 | Halpern | 355/40 X |
| 4,260,245 | 4/1981 | Huser | 355/64 X |
| 4,273,440 | 6/1981 | Froessl | 355/40 |
| 4,344,683 | 8/1982 | Stemme | 354/106 |
| 4,370,409 | 1/1983 | Bostroem | 355/40 X |
| 4,417,811 | 11/1983 | Hamer | 355/77 |

FOREIGN PATENT DOCUMENTS

| | | |
|---|---|---|
| 49-109480 | 9/1974 | Japan . |
| 51-107281 | 8/1976 | Japan . |
| 53-76929 | 6/1978 | Japan . |
| 56-16589 | 4/1981 | Japan . |
| 56-38341 | 4/1981 | Japan . |

Primary Examiner—Richard A. Wintercorn
Attorney, Agent, or Firm—Young & Thompson

[57] ABSTRACT

A side printing apparatus for providing latent images of characters, numerals, symbols and the like on a photographic film moving in continuous motion includes a film sensitivity responsive means for generating several kinds of pulse having different pulse lengths which are predetermined in accordance with sensitivity of film. The pulse operates to cause a light image forming device to be energized for a time defined corresponding to the pulse length thereof so as to provide a latent image of character, numeral, symbol or the like on a photographic film.

9 Claims, 4 Drawing Figures

SIDE PRINTING APPARATUS

BACKGROUND OF THE INVENTION

The present invention relates to a side printing apparatus for applying latent images of information marks such as manufacturer's name, film type, frame number, date information, production lot number and the like described in characters, numerals, symbols and the like onto the margins of a photographic film during the manufacture thereof and, more particularly, to such apparatus which is adapted to change the exposure of film to a light image produced by a light image forming arrangement installed therein.

In the manufacture of photographic film, it is usual to apply latent images of information marks such as manufacturer's name, frame number and the like along the longitudinal margin or margins of a film. The procedure of applying latent images on a film is generally called as side printing and is performed by side printing apparatus. There have been generally known and widely used various types of side printing apparatus as disclosed in Japanese Utility Model Publication No. 16589/'81, Japanese Pat. unexamined Publication Nos. 42037/'82 and 163226/'82 and Japanese Utility Model unexamined Publication 38341/'81. Such apparatus may be generally divided into four types in accordance with the form of light image forming arrangement. One is a projection arrangement in which a pattern plate and a light source such as lamp, light emitting diode or the like for illuminating the pattern plate are used to project images of information marks onto a film, another is a light emitting diode (LED) matrix array in which a plurality of LEDs are selectively driven to form light marks, the third is a information mark display device such as cathode ray tube, and the last is a two-dimensional laser beam scanning device for successibly scanning a film with a laser spot. For the purpose of applying latent images on a film without incurring any adverse blurring effects, the light image forming device is adapted to move in synchronism with the motion of film or otherwise to be energized for a very short interval.

For adapting a side printing apparatus to various kinds of film with different sensitivity, a requirment for the side printing apparatus is that the exposure of film to light images is adaptable in accordance with the sensitivity of a film to provide the film with a preferred density of images of information marks. In conventional side printing apparatus, the adjustment of exposure is caused as a result of change of the intensity of current through the light image forming device which is done by manipulating a manually operable dial.

One of the problems associated with the side printing apparatus above-mentioned is concerned with inexpediency characterized by bother of the manupulation of the dial to adjust the exposure which results in waste of time.

SUMMARY OF THE INVENTION

It is therefore a primary object of the present invention to provide a side printing apparatus wherein the adjustment of film exposure in accordance with sensitivities of film is performed by an easy operation.

It is another object of the present invention to provide a side printing apparatus wherein the adjustment of film exposure in accordance with sensitivity of film is done without incurring waste of time.

In accomplishing these and other objects, the present invention proposes an apparatus which is characterized in that there is provided means for generating several kinds of pulses having different pulse lengths in accordance with film sensitivities. When entering a film type information indicating film sensitivity into the apparatus, the means generates a pulse having a pulse length corresponding to the indicated film sensitivity; which pulse operate to cause a light image forming device to be device for a time defined corresponding to the pulse length thereof so as to produce a light image.

The present invention proposes an apparatus which is charcterized in that there is provided means for generating pulse signals with different pulse lengths in accordance with sensitivities of film; and which generated pulse signals operate to fix the interval during which a light image forming device is maintained to be energized.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Preferred embodiments of the invention will be now described with reference to the drawings.

Figure 1:
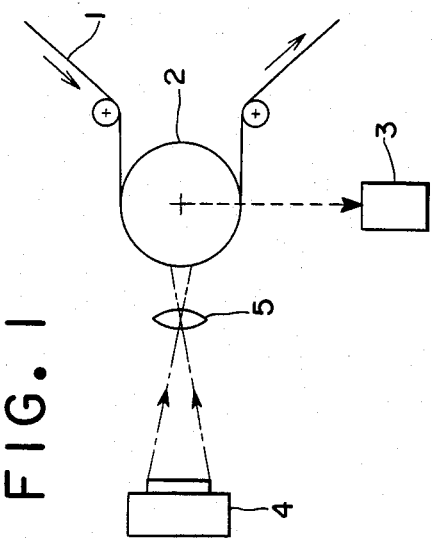
FIG. 1 is a schematic illustration of a printing station of side printing apparatus.

As shown in FIG. 1, a film 1 moves in continuous motion in the direction indicated by the arrow; which continuous motion is caused by a well-known mechanism not shown. A rotatable drum 2 which holds the film in close contact with the peripheral surface thereof in the focal plane of a focusing lens 5 or lens system is adapted to rotate as a result of the continuous motion of the film 1. A rotary encoder 3 which is rotatably associated with the drum 2 is provided for the purpose of generating pulse signals proportional to the length of the film moved.

Opposite to the rotatable drum 2 there is disposed a light image forming apparatus for producing light images of information marks which, in turn, are projected on a reduced scale onto the margin of a picture frame of the film 1 by the lens 5.

Figure 2:
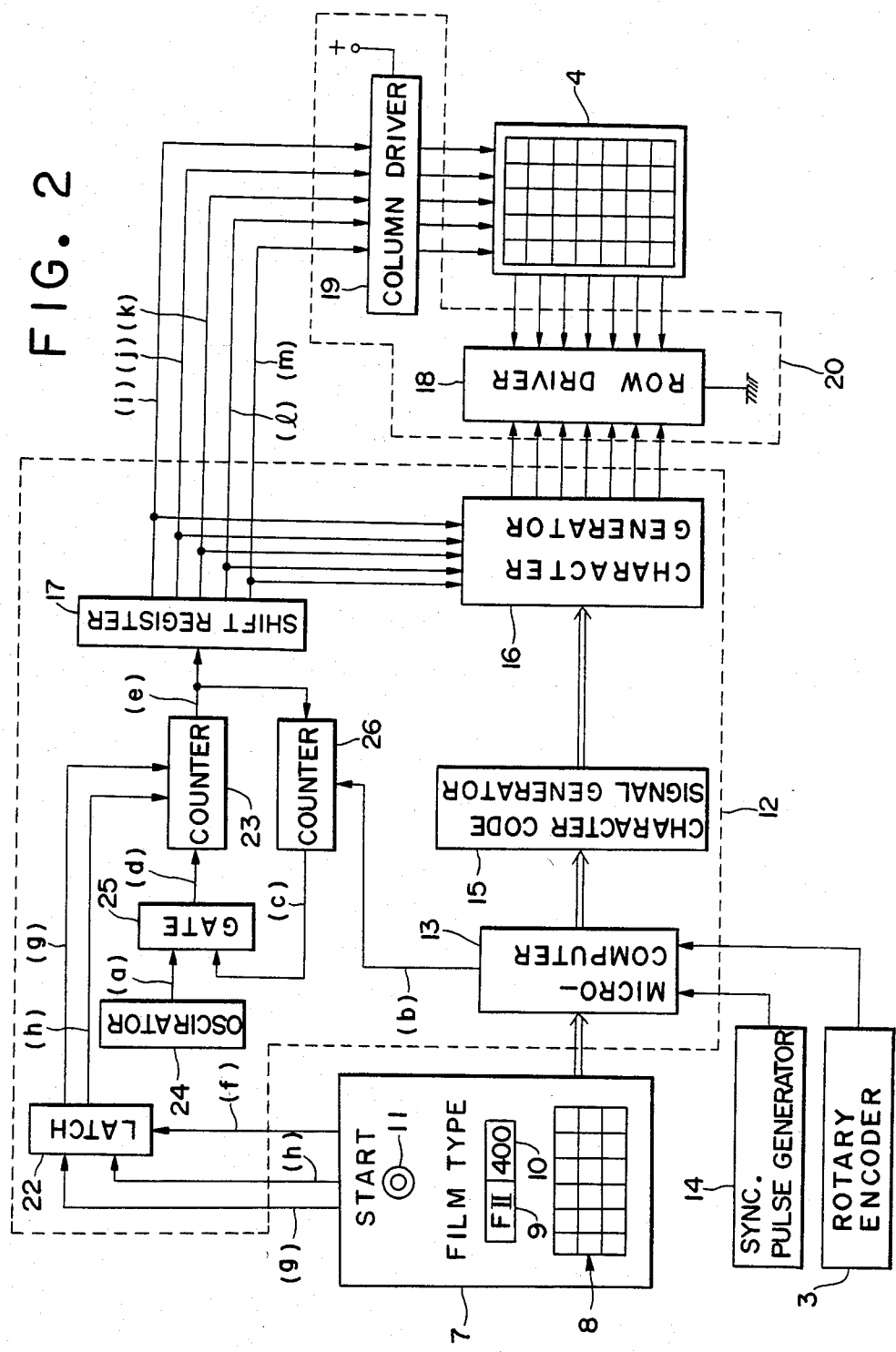
FIG. 2 is a schematic block diagram of the side printing apparatus of a preferred embodiment of the present invention.

Referring to FIG. 2 there is shown a side printing apparatus which is provided with a dynamic drive system of light image forming arrangement. An information mark setting device 7 has keyboard 8 including alphabet and numeral keys, film type setting keys 9 and 10 and a start key 11 which should be operated after operation of the film type setting key 9 or 10. A character, numeral or other mark and a location information is entered into the keyboard 8. A film type information is entered into the film type setting keys 9 or 10 in accordance with the sensitivity of the film processed. These information, that is mark, location and film type information, is supplied to a general purpose micro-computer 13 of a main control device 12. A synchronizing pulse generator 14 is adapted to generate a synchronizing pulse in cooperation with, for instance, a cutter provided for cutting the film to a predetermined length. The synchronizing pulse is supplied to the micro-computer 13 so as to execute a program directing the mark to be printed and the location where the mark is printed. The micro-computer 13 then retrieves an instruction signal (b) for the energization of the light image forming arrangement and the mark data with checking location data as a result of counting the pulse signals from the rotary encoder 3.

A character code signal generator 15 operates to convert the character data from the micro-computer 13 to character code signals which, in turn, are directed to a character generator 16. The character generator 16 which principally comprises a decoder, memory, matrix, column selection circuit and buffer circuit, operates to generate character outputs in a vertical row in dependence on column selection signals (i), (j), (k), (l), and (m). The character outputs from the character generator 16 are directed to a row driver 18, and on the other hand, the column selection signals (i) to (m) are respectively supplied to a column driver 19. These row and column drivers 18 and 19 constructs a driving circuit 20 for the light image forming arrangement 4 which is driven in a well-known dynamic drive system by allowing the flow of pulsed current from the column driver 19 to the row driver 18.

A character display device of the type using a 5×7 light emitting diode matrix is often employed as the light image forming arrangement 4. The character display device may take the form of a light emitting diode matrix of, for instance, 12×16, or 16×15 type for displaying chinese characters satisfactory. Further it is possible to employ an unidimentional light emitting diode array placed in a line which is energized in a predetermined interval because of the fact that the film is exposed to the light from the light emitting diode array during the continuous motion thereof.

As aforementioned, the film type information, i.e., the sensitivity of film, is entered into the film type setting key 9 or 10 which is corresponding to, for instance in this embodiment, the film type of the sensitivity of ISO 100 or ISO 400 shown by the indication "F II" or "400", respectively. The operation of the film type setting keys 9 and 10 provides film type indication signals (g) and (h), respectively which are latched in a latch circuit 22 upon receiving a signal (f) provided when the key 11 is operated.

The film type selection signals (g) and (h) from the latch 22 are supplied to a counter 23 so as to preset the count thereof in accordance to the sensitivity of film. It should be noted that a relatively large count is preset when a low sensitivity of film is processed and, on other hand, a relatively small count when a high sensitivity of film is processed.

A oscillator 24 produces an output clock pulse signal (a) which, in turn, directed to a gate 25. A clock pulse signal (d) from the gate 25 is supplied to and counted by the counter 23. When the counter 23 reaches the preset count, it produces a signal (e) which is directed to both a shift register 17 and a counter 26 and commences counting again. The counter 26 is adapted to close the gate 25 upon counting five signals (e) from the counter 23 and to be cleared upon receiving the instruction signal from the micro-computer 13 so as to open the gate 25, allowing the clock pulse signal from the oscillator 24 to pass therethrough.

Figure 3:
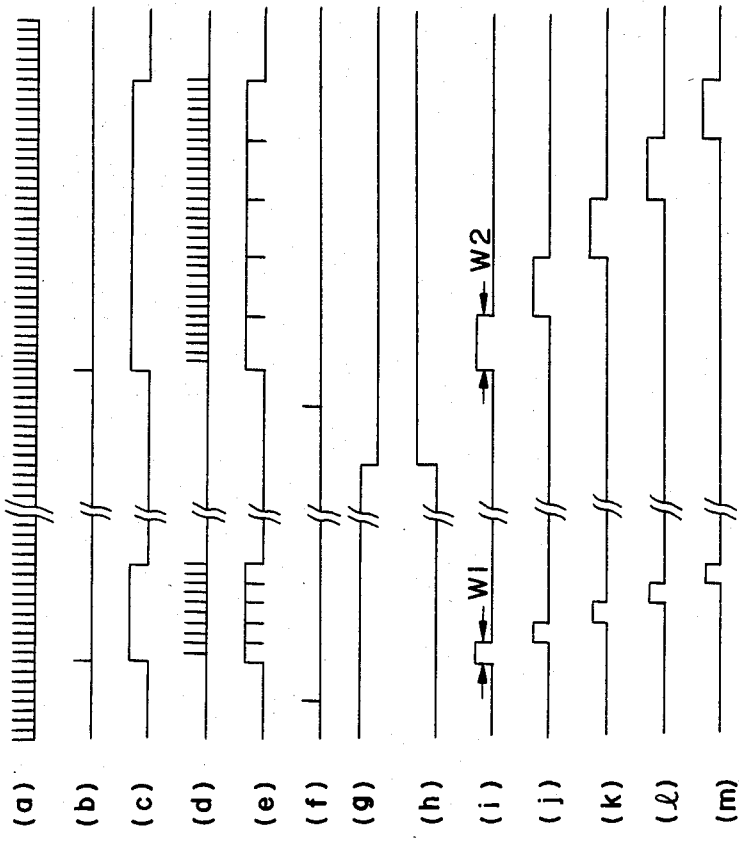
FIG. 3 is a timing chart of the side printing apparatus of FIG. 2.

Now referring to FIG. 3, there are shown the waveforms of the signals indicated in FIG. 2. As the preset count of the counter 23 is changed in accordance with film sensitivities the period with which the signal (e) is produced is changed. Consequently, the pulse length of each of the column selection signals (i), (j), (k), (l) and (m) changes in dependence on the period, resulting in a change of the interval in which the light image forming arrangement 4 is maintained energized. The operation of the key 10 for the film type of the sensitivity of ISO 400 forces the pulse length of each column selection signal to be "W1" because of a small preset count of the counter 23, so that the light image forming arrangement 4 is caused to be energized in a relatively short interval for the proper exposure of the film ISO 400. On the other hand the operation of the key 9 for the film type of ISO 100 forces the pulse length of each column selection signal to be "W2" larger than "W1" because of a large preset count of the counter 23, so that the light image forming arrangement 4 is caused to be energized in a relatively long interval.

Figure 4:
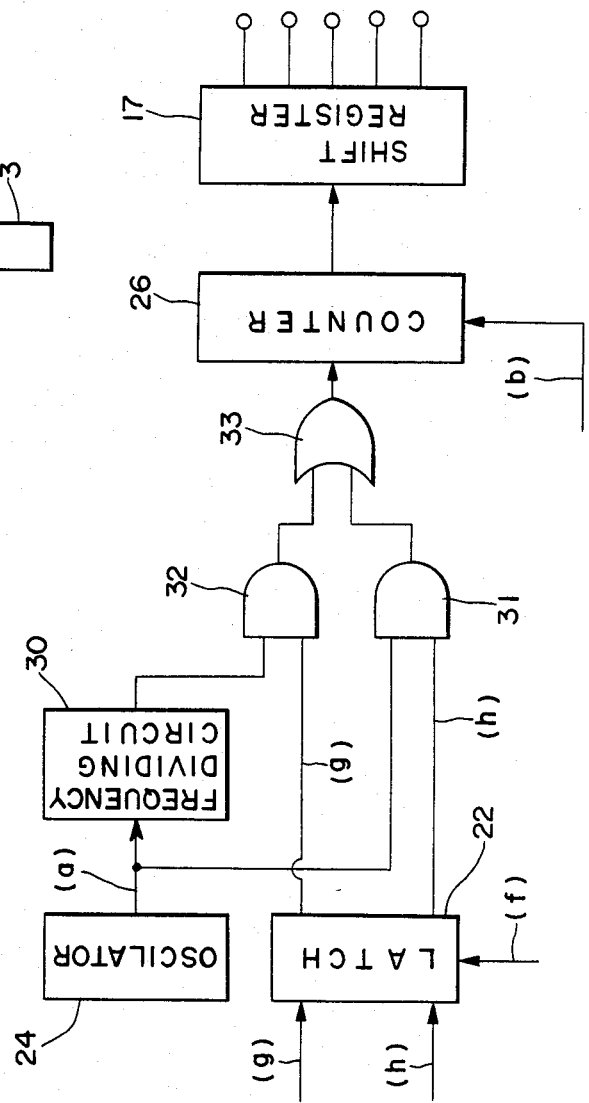
FIG. 4 is a schematic block diagram of the side printing apparatus of another embodiment of the present invention.

Referring to FIG. 4 showing the part of the side printing apparatus of another embodiment of the present invention, there are shown a frequency dividing circuit 30 and AND circuit 31 both of which, in turn, receive the clock pulse signal (a) from the oscillator 24. Divided clock pulse signal from the frequency dividing circuit 30 is directed to AND circuit 32. As AND circuits 31 and 32 are selectively caused to open by the respect of signals (g), (h) from the latch 22, the clock pulse signals of a pulse length according to film sensitivities are applied to a counter 26 through OR circuit 33.

It should be further noted that the film is produced with no longwise prolonged character image because of the fact that the light image forming arrangement 4 is adapted to be energized in an extreamly short time. In the case of the long time energization of the light image forming device 4 which is adpated to produce low luminance of light images, the arrangement is moved in synchronism with the continuous motion of film as is known well in the art. In the side printing apparatus of the present invention, it is possible to use a light image forming device in a static drive system in which all light emitting elements of a character display device are simultaneously driven to emit light.

It will be understood that the present invention is not limitted in the embodiments thereof described hereinbefore, modifications and variations may be effected without departing from the spirit and scope of the novel concepts of the present invention. For example, the film type setting keys can be omitted in the case that a side printing apparatus is adapted to read the film type information which is provided at the leading or trailing portion of film in a preceding process. Furthermore, the present invention is applicable not only to a long web of film but also to disk type film units or the like.

What is claimed is:

1. A side printing apparatus for providing latent images of characters, numerals, symbols and the like on a photographic film moving in continuous motion by exposing it to light images produced by a light image forming device said apparatus comprising:

means for giving an indication of the film type of a photographic film to be provided with latent images thereon;

means for generating pulse signals having a pulse length in accordance with the film type indication from said means; and drive means for causing a light image forming device to be energized for a time defined corresponding to said pulse length so as to produce said latent images.

2. A side printing apparatus as claimed in claim 1 wherein said pulse signal generating means comprising:
an oscillator for producing a clock pulse;
a gate for controlling the clock pulse from said oscillator to pass therethrough;
a first counter for generating said pulse signals till the count of said clock pulse counted reaches a preset count which is preset by said film type indication; and
a second counter for counting the number of said generation of said pulse signals so as to cause side gate to close when said counted number becomes equal to the number of column to a picture element matrix of character, numeral, symbol or the like.

3. A side printing apparatus as claimed in claim 1 wherein said light image forming arrangement comprises a character display device of the type having a plurality of light emitting diodes disposed in a matrix.

4. A side printing apparatus as defined in claim 3 further comprising a shift register for counting output signals from said first counter so as to drive said drive means consecutively every column.

5. A side printing apparatus as defined in claim 1 wherein said pulse signal generating means comprises means for generating a plurality of pulses with different pulse lengths, means for selecting one of said plurality of pulses in accordance with said film type, and counter means for counting said selected pulse so as to allow said selected pulse of which the number is equal to the number of column to a picture element matrix of character, numeral, symbol or the like to be directed to said drive means.

6. A side printing apparatus as defined in claim 5 wherein said means for generating a plurality of pulse comprises an oscillator for producing a clock pulse and at least a frequency dividing device for dividing said clock pulse from said clock pulse oscillator.

7. A side printing apparatus as defined in claim 6 wherein said selecting means comprises AND circuits of which the number is equal to the number of said pulses with different pulse lengths, said AND circuit calculating a logical sum of said selected pulse and a signal provided by said film type indication means.

8. A side printing apparatus as defined in claim 7 wherein said light image forming arrangement comprised a character display device of the type having a plurality of light emitting diodes disposed in a matrix.

9. A side printing apparatus as defined in claim 8 further comprising a shift counter for counting output from said selected pulse counting means so as to drive said drive means consecutively every column.

* * * * *